United States Patent Office 3,772,447
Patented Nov. 13, 1973

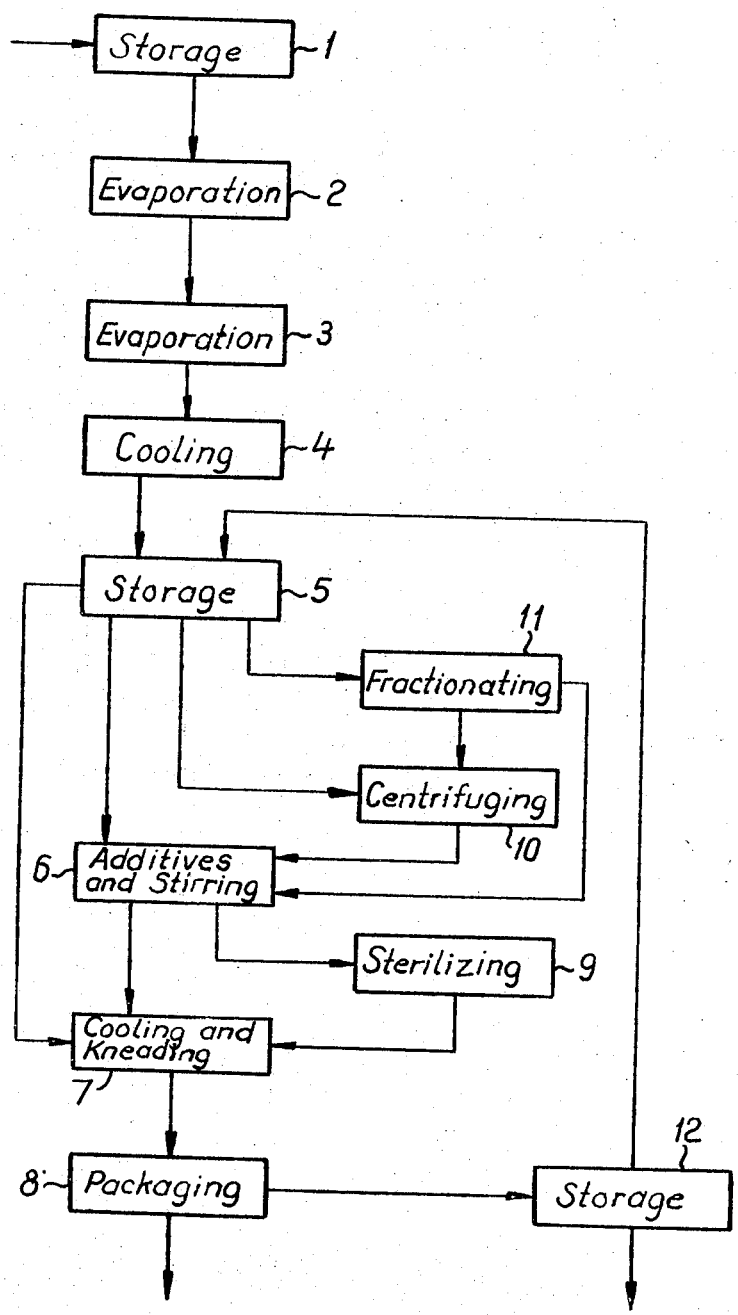

3,772,447
METHOD OF MAKING BUTTER
Gunter Karl Damerow, Hamburg, Germany, assignor to Alfa-Laval AB, Tumba, Sweden
Filed Mar. 25, 1971, Ser. No. 128,098
Int. Cl. A23c 15/00
U.S. Cl. 426—342
10 Claims

ABSTRACT OF THE DISCLOSURE

Highly concentrated cream is heated and evaporated at least sufficiently to break its oil-in-water emulsion; and there is added to at least part of the resulting fatty mass, while stirring it, such a quantity of water that the mass contains the water quantity desired in the finished butter. Salt and possibly other substances are also added; and the mass is subsequently cooled at least partly while mechanically kneading it, to obtain the butter.

---

The present invention relates to a method of making butter. The method is mainly characterized by the steps of heating highly concentrated cream and evaporating at least to such an extent, that the emulsion oil-in-water will break, adding to at least a part of the fatty mass thus obtained, while stirring the same, such a quantity of water that the mass will contain the quantity of water which the finished butter should contain, also adding salt and other possible additives, and cooling the mass, at least partly while it is being mechanically kneaded, whereby butter is obtained.

The traditional method of making butter by churning has several disadvantages. The most serious disadvantages are that the method is expensive and that the butter obtained will not keep very well. It can be stored only in freezing chambers and for a fairly limited time. The insufficient keeping property has become a serious concern, particularly in countries where there is a considerable surplus butter production.

Various attempts have been made to provide methods of making butter that will keep better and which can be produced at lower cost. One such method is the so-called Alfa-method. According to the Alfa-method, cream is concentrated to a fat content of about 80 to 85% (i.e., to a concentration at which the cream contains as much water as the finished butter may contain according to regulations) and then a phase inversion is brought about and butter is formed by cooling the concentrated cream to a temperature at which the cream-fat will solidify. A satisfactory consistency of the butter thus produced is obtained by mechanical kneading of the solidifying water-in-oil emulsion. Even butter produced by the Alfa-method has a limited keeping property.

The limited keeping property has been attributed mainly to the water in the butter, and it has been attempted to improve that property by removing the water, as by drying the butter in a spray dryer and even evaporating melted butter in the ordinary way. According to a process that is now frequently utilized, a butter free from water is made by separating the melted butterfat from the residual water phase in the butter by means of a centrifugal separator.

These methods of making butter with a good keeping property have not been very successful, however. For instance, the method of spray drying melted butter is extremely expensive and therefore cannot be utilized in practice, although the keeping properties of the spray dried or evaporated butter are considerably better than those of the non-dried butter. The water-free butter obtained by means of centrifugal separation has been found to have less good keeping properties than the evaporated butter. The results of investigations indicate that the presence or absence of the water in the butter is not the only factor of decisive importance for the keeping properties of the butter. It is a considerable disadvantage of dried butter that its consistency and taste differ so much from those of the traditional butter that consumers refuse to identify the product as being butter.

The problem which the present invention is primarily intended to solve is to make butter in a way that is less costly than the traditional churning method. It has been found, however, that the solution of the problem also holds, in itself, an excellent method of controlling the production of butter in relation to the temporary demand on the market, practically independently of the prevailing over-production of milk. That is, in a particularly useful embodiment of the process of production according to the invention, an intermediate product is obtained which can be kept for a very long time under comparatively simple conditions without deteriorating.

Some embodiments of the new method will be described below with reference to the accompanying drawing, in which the single illustration is a flow chart showing the fundamental features of the method.

According to the present invention, as with the previously known Alfa-method, the process starts from highly concentrated cream. The cream is concentrated in the known way in a centrifugal separator, preferably to a fat content of 80 to 84%. When concentrating the cream to this high fat content, it is always heated and therefore has a low viscosity.

Cream is an oil-in-water emulsion. This emulsion must be broken. As distinguished from the Alfa-method, the emulsion in the new method is not broken by means of cooling but by means of evaporation. According to the invention, so much water is then added to the resulting fatty mass, while it is being stirred, that it will contain as much water as the finished butter should contain. This can be accomplished because the emulsifiers originally present in the cream, mainly phospholipides, still remain in the fatty mass. When working the added water into the fatty mass, the latter is continuously kept heated and in a melted condition.

At the same time as water is added, salt and possibly other substances are added, such as dyestuffs. The liquid emulsion is then cooled, at least partly while being mechanically kneaded, thus providing time for the fats of the emulsion to crystallize and mix to form a homogeneous product. Apart from the fact that the product contains a considerably larger quantity of phospholipides than butter produced by churning, it has the same composition as such butter. It has the same taste and approximately the same consistency and is identified as butter.

A suitable equipment for the cooling, partly while mechanically kneading the product, has been developed by Alfa-Laval Bergedorfer Eisenwerke GmbH in Hamburg, Germany. It has been described in the German periodical "Milchwissenschaft," vol. 19, 1964. The apparatus is adjusted to cool the butter to a first melting point range at a temperature of about 18° C. and then to a second melting point range at a temperature below 10° C. While being cooled to the first temperature range, the fat is subjected to a vigorous mechanical kneading, and this also takes place after the cooling to the second temperature range. In this way the original crystal structure of the fat, which was lost during the evaporation of the cream, is restored.

A comparatively heavily salted butter is preferred in some countries. In connection with the traditional methods of making butter, there is an inherent difficulty in mixing such a large quantity of salt into the butter as is desired. In has not been possible to add the salt in the form of a concentrated water solution, as the butter has already contained so much water that a sufficient quantity of concentrated salt brine would have increased the water content of the butter beyond the content permitted by law. Various methods of mixing solid salt into the butter have been tried, with the result that the butter has had a tendency to become mottled and be of an inferior quality in other respects, particularly after being kept in storage. On the other hand, since the fatty mass obtained according to the present invention contains a comparatively small quantity of water, the desired quantity of salt in the form of a water solution can be mixed into the mass without any difficulty. This is an important advantage of the new method.

A further advantage of the method according to the invention is that the processing costs are considerably lower than the costs of making butter by the traditional method of churning. This will become more apparent from the following description of a preferred embodiment of the invention.

According to this preferred embodiment, the evaporation of the cream is carried beyond the point where the emulsion of oil-in-water is broken. More particularly, the evaporation is carried on until the water content of the fatty mass is below 0.1%.

The concentrated and heated cream is preferably kept in a storage tank indicated at 1 in the drawing. From this tank the cream flows to the evaporation plant. This can be constructed in various ways, but in principle it is one or a series of heat exchangers of a suitable type. It has provided suitable means to evaporate the cream in two steps. The first step, indicated at 2 in the drawing, is performed in a so-called circulation evaporator through which a certain volume of cream is forced to pass repeatedly and in which so much water is evaporated that only about 0.5% will remain. The second step 3 is carried out in a so-called single-pass-evaporator through which the cream is passed only once. In this evaporator the water content is reduced until the cream contains less than 0.1% water. Preferably, the temperature is kept at 120° C. during the evaporation and the latter is carried out at atmospheric pressure or at a lower pressure.

The fatty mass thus obtained must now be cooled. It is suitable to cool it in a heat exchanger and let the heat exchanger serve as a pre-heater of the highly concentrated cream before directing it into the evaporation plant. The heat exchanger is indicated by numeral 4 in the drawing. The cooled but still liquid fatty mass is preferably stored in the balance tank 5.

From the tank 5, the fatty mass is directed to the equipment indicated by numeral 6 in the drawing. It consists in principle of a vessel provided with a stirring device. While stirring, so much water is now added as the finished butter should contain. A desired quantity of satl and possibly other additives, such as a dyestuff, is now added. In this case it is particularly easy to emusify the water in the liquid fatty mass because the latter, as previously mentioned, contains all emulsifiers dissolved in the fat which originally were contained in the highly concentrated cream, mainly phospholipides in the shell around the little fat globules of the cream.

The mass now obtained contains all constituents which are contained in normal butter, but it is liquid and must be cooled and given the same granular structure as that of normal butter. The cooling is carried out in a heat exchanger to a temperature of 35° C. to start with and then, while being mechanically kneaded, in the apparatus indicated by numeral 7 in the drawing. This apparatus is arranged to cool the fatty mass to a temperature below 10° C. and corresponds to the cooling equipment mentioned above and described in the previously identified "Milchwissenschaft" publication. The product obtained after cooling and accompanying kneading has a consistency and other properties corresponding to the properties of butter made by churning. Finished butter has thus been produced, and it is packed in packing machines in the ordinary way. These have been indicated by numeral 8 in the drawing.

Improved keeping properties are obtained if the liquid water-in-oil emulsion flowing from the apparatus 6 is sterilized (a term used heerin to include pasteurizing) in the sterilization apparatus 9 before it is directed to the cooling and kneading apparatus 7.

The fatty mass flowing from the balance tank 5 contains other substances originally being constituents of the cream, such as casein and other proteins, etc., which would have been separated from the butterfat in the making of butter by the traditional methods, partly when separating the butter grains from the buttermilk, and partly when washing the grains. If it is desirable to separate these substances from the fatty mass in which they are dispersed, this can be effected by treating the fatty mass in a centrifugal separator before it is directed to the apparatus 6. The centrifugal separator for this purpose has been indicated by numeral 10 in the drawing.

The method according to the invention also makes it possible to modify within wide limits the consistency of the produced butter. The fatty mass obtained in apparatus 4 and flowing from balance tank 5 can be subjected to fractional separation, and only chosen fractions, for instance of low melting point, are processed in the apparatus 6. Fractional separation of the mixture of fats constituting the fatty mass can be carried out in a conventional manner by means of any of the apparatus known in the art for the purpose, this fractionating apparatus being indicated at 11 in the drawing.

The processing costs for the production of butter by the preferred method of the present invention are comparatively low. If the processing costs of the production of the fatty mass with a water content lower than 0.1% are set to 1 per unit of weight, then the costs of the further processing of the fatty mass for obtaining the finished butter can be set to 1 as well. Under the same conditions in the way of overhead costs, labor cost, etc., the production of butter by means of churning can, roughly estimated, be set to 4 (i.e., twice as much).

The fatty mass with a water content less than 0.1% obtained in the apparatus 4 has exceedingly good storing properties. It can be stored for several years at a temperature of about 8 to 10° C., without any deterioration of its quality as a consequence. This circumstance makes it possible to keep the milk fat, without too heavy costs, by storing it in the form of the aforementioned fatty mass after it has been cooled. It can then be taken from the storage place for further processing at a rate that will be suitable with reference to the temporary demand for finished butter. In other words, the production process is then interrupted when the nearly water-free fatty mass has been obtained. This is a novel feature in connection with the present invention. Of course, it is also possible and suitable to export the milk fat, from countries with a surplus production, in the form of the cooled fatty mass. The further processing of the mass to finished butter can then be carried out in the importing country.

The reasons why the fatty mass has such outstanding storing properties is believed to be two-fold, namely, that the mass contains a large quantity of phospholipides dissolved in the fat, and that the water content of the product is so small, less than 0.1%. This water is presumably chemically bound in the product, and it should therefore not be available for any processes that would develop into rancidness. The small water content of the evaporated cream is probably attached instead to the hydrophilic groups of the proteins, which normally surround the little fat globules of the cream like a shell. The substances constituting the shell are mainly the said phospholipides. Those are dissolved in the fat when the water content is as low as stated. In addition, the finely distributed phospholipides in solution are believed to act as anti-oxidants.

If the above explanation of the excellent storing quality of the product is correct, then it will also explain why the previously mentioned known methods of making milk fat have not been quite successful in providing it with good storing properties. In those cases the processing generally started from churned butter, and that portion of the cream's water phase which remained in the butter after churning was removed in one way or another, i.e., the butter was dried. This butter, however, was deprived of a large quantity of the phospholipides of the cream in connection with the churning and washing, as previously indicated. The dried butter therefore contained too small a quantity of anti-oxidants and also too small a quantity of substances for the chemical combination of the water still present in spite of the drying operation.

If it is desired to interrupt the production process when the fatty mass with a water content less than 0.1% has been obtained, then this mass is cooled in a way similar to that utilized when cooling the finished butter, the fatty mass being passed directly from the balance tank 5 to the apparatus 7. Also in this connection, the cooling is carried out in two steps, first to a temperature of about 18° C. and then to a temperature below 10° C. During the cooling in the first step and after the cooling in the second step, the mass is intensely mechanically kneaded. The fats of higher melting points will in the meantime be given back their natural crystal structure, and the crystals and the fats of lower melting points will be mixed to form a homogeneous product which will be packed in the packing apparatus 8. In many cases this product can be used in the food industry without being further processed to finished butter. The site for the storage of the cooled and packed fatty mass has been indicated by numeral 12 in the drawing. From here it may be returned after melting to the balance tank 5, or it may be sent to any other place for further processing.

I claim:

1. A method of making butter which comprises heating highly concentrated cream and evaporating the same at least sufficiently to break the oil-in-water emulsion of the cream, thereby providing a fatty mass; adding to at least part of said fatty mass, while keeping said mass in a melted condition and stirring the same, such a quantity of water that the mass contains the water quantity desired in the finished butter; adding salt to said mass; and cooling the mass at least partly while mechanically kneading the mass, to obtain the butter.

2. A method according to claim 1, in which said highly concentrated cream has a fat content of 80 to 84%.

3. A method according to claim 1, in which said evaporating is continued until the water content of the cream is reduced to less than 0.1%.

4. A method according to claim 3, in which said evaporating is effected in two steps wherein the cream is circulated through a first step to reduce the water content to about 0.5% and is then passed once through a second evaporating step to reduce the water content to less than 0.1%.

5. A method according to claim 1, in which said evaporating is effected at a pressure not in excess of atmospheric and at a temperature of about 120° C.

6. A method according to claim 1, in which said cooling is effected in a first step to about 35° C., then in a second step to a temperature below 18° C. while mechanically kneading the mass, and then in a third step to a temperature below 10° C. with subsequent mechanical kneading.

7. A method according to claim 1, in which the fatty mass after said evaporating step is kept in storage prior to said adding steps.

8. A method according to claim 1, comprising also the step of sterilizing the fatty mass after said adding steps.

9. A method according to claim 1, comprising also the step of centrifuging the fatty mass from the evaporating step, prior to said adding steps, to remove casein and other dry substances originating from the milk serum.

10. A method according to claim 1, comprising also the step of subjecting the fatty mass from the evaporating step to fractional separation prior to said adding steps, only selected fractions of the mass being passed from the fractional separation to said adding steps.

References Cited
UNITED STATES PATENTS

| | | | |
|---|---|---|---|
| 2,461,117 | 2/1949 | Lindgren | 99—119 |
| 2,466,895 | 4/1949 | Horneman et al. | 99—119 |
| 2,569,203 | 9/1951 | Stigen | 99—119 |
| 2,729,563 | 1/1956 | Goede | 99—119 |

RAYMOND N. JONES, Primary Examiner